US012624180B2

(12) United States Patent
Vandenbroeck et al.

(10) Patent No.: US 12,624,180 B2
(45) Date of Patent: May 12, 2026

(54) IN-SITU FORMATION OF LOW DENSITY THERMOPLASTIC POLYURETHANE FLEXIBLE FOAMS

(71) Applicant: Huntsman International LLC, The Woodlands, TX (US)

(72) Inventors: Jan Vandenbroeck, Scherpenheuvel-Zichem (BE); Steve Andre Woutters, Deurne (BE); Rajesh Kumar Gajendran, Brussels (BE); Martino Dossi, Etterbeek (BE); Rene Alexander Klein, Hoegaarden (BE); Mark Joseph Brennan, Aarschot (BE)

(73) Assignee: HUNTSMAN INTERNATIONAL LLC

( * ) Notice: Subject to any disclaimer, the term of this patent is extended or adjusted under 35 U.S.C. 154(b) by 1004 days.

(21) Appl. No.: 17/770,853

(22) PCT Filed: Nov. 9, 2020

(86) PCT No.: PCT/EP2020/081438
§ 371 (c)(1),
(2) Date: Apr. 21, 2022

(87) PCT Pub. No.: WO2021/094239
PCT Pub. Date: May 20, 2021

(65) Prior Publication Data
US 2022/0363858 A1 Nov. 17, 2022

(30) Foreign Application Priority Data

Nov. 12, 2019 (EP) .................................... 19208441

(51) Int. Cl.
| | |
|---|---|
| *C08G 18/48* | (2006.01) |
| *C08G 18/10* | (2006.01) |
| *C08G 18/32* | (2006.01) |
| *C08G 18/38* | (2006.01) |
| *C08G 18/42* | (2006.01) |
| *C08G 18/66* | (2006.01) |
| *C08G 18/76* | (2006.01) |
| *C08J 9/12* | (2006.01) |
| *C08J 9/14* | (2006.01) |

(52) U.S. Cl.
CPC .............. *C08J 9/146* (2013.01); *C08G 18/10* (2013.01); *C08G 18/3206* (2013.01); *C08G 18/3851* (2013.01); *C08G 18/4238* (2013.01); *C08G 18/4825* (2013.01); *C08G 18/4854* (2013.01); *C08G 18/664* (2013.01); *C08G 18/6674* (2013.01); *C08G 18/6685* (2013.01); *C08G 18/7671* (2013.01); *C08J 9/122* (2013.01); *C08G 2110/0008* (2021.01); *C08G*

*2110/0066* (2021.01); *C08J 2201/022* (2013.01); *C08J 2203/06* (2013.01); *C08J 2203/162* (2013.01); *C08J 2205/05* (2013.01); *C08J 2205/06* (2013.01); *C08J 2375/06* (2013.01); *C08J 2375/08* (2013.01); *C08J 2375/12* (2013.01)

(58) Field of Classification Search
CPC .. C08G 18/10; C08G 18/244; C08G 18/3206; C08G 18/3246; C08G 18/3851; C08G 18/4238; C08G 18/4825; C08G 18/4854; C08G 18/6637; C08G 18/664; C08G 18/667; C08G 18/6674; C08G 18/6685; C08G 18/7671; C08J 9/12; C08J 9/122; C08J 9/146; C08J 2201/022; C08J 2203/06; C08J 2203/162; C08J 2205/05; C08J 2205/06; C08J 2300/22; C08J 2375/04; C08J 2375/06; C08J 2375/08; C08J 2375/12; C08K 5/54; C08L 83/04
See application file for complete search history.

(56) References Cited

U.S. PATENT DOCUMENTS

| | | | |
|---|---|---|---|
| 3,769,245 A | 10/1973 | Stewart et al. | |
| 2014/0193631 A1 | 7/2014 | Oyaizu | |
| 2018/0100049 A1 | 4/2018 | Prissok et al. | |
| 2018/0237605 A1* | 8/2018 | Chang | C08G 18/3284 |

FOREIGN PATENT DOCUMENTS

| | | | | |
|---|---|---|---|---|
| CN | 105884998 A | 8/2016 | | |
| CN | 109942774 A | 2/2019 | | |
| CN | 109694494 A | 4/2019 | | |
| RU | 2031098 C1 | 3/1995 | | |
| RU | 2201941 C2 | 4/2003 | | |
| RU | 2507215 C2 | 2/2014 | | |
| TW | 201313767 A | 4/2013 | | |
| WO | WO-0234823 A2 * | 5/2002 | | C08J 9/00 |
| WO | 2019122122 A1 | 6/2019 | | |

OTHER PUBLICATIONS

Russian Search Report received in corresponding RU Application 2022115726 issued Apr. 10, 2024. Translation herewith.
International Search Report and Written Opinion received in corresponding PCT Application PCT/EP2020/081438 completed Jan. 22, 2021 and mailed Feb. 2, 2021.

* cited by examiner

*Primary Examiner* — John M Cooney

(57) ABSTRACT

A reactive mixture and method for making a thermoplastic polyurethane (TPU) flexible foam having a predominantly open-cell structure (open-cell content of ≥50% by volume calculated on the total volume of the foam and measured according to ASTM D6226-10) and an apparent density below 200 kg/m³.

16 Claims, 2 Drawing Sheets

IN-SITU FORMATION OF LOW DENSITY THERMOPLASTIC POLYURETHANE FLEXIBLE FOAMS

CROSS-REFERENCE TO RELATED APPLICATIONS

This application is the National Phase of International Application PCT/EP2020/081438 filed Nov. 9, 2020 which claims priority to EP Provisional App. No. 19208441.6 filed Nov. 12, 2019. The noted applications are incorporated herein by reference.

FIELD OF INVENTION

The present invention relates to processes for forming low density thermoplastic polyurethane foams, more in particular thermoplastic flexible foams having a predominantly open-cell structure and preferably having elastomeric properties.

The present invention further relates to reactive mixtures for making the low density thermoplastic foams according to the invention.

The present invention relates to thermoplastic low density polyurethane foams with a predominantly open-cell structure, a hard-block content in the range 15 up to 65%, an apparent density<200 kg/m³ measured according to ISO 845 and improved mechanical properties such as tear strength.

BACKGROUND OF THE INVENTION

Conventional flexible polyurethane foams with an open-cell structure are typically produced using isocyanate reactive compounds with a functionality higher than 2 in order to have stability during foaming and to achieve the required mechanical properties. It is known that the use of isocyanate reactive compounds with a functionality higher than 2 will give rise to a cross-linked polyurethane matrix. Furthermore, most of these foams are chemically blown using water, giving rise to urea-hard-blocks with a degradation temperature lower or close to its melt temperature. These two traits of conventional flexible polyurethane foams render them thermoset materials rather than thermoplastic which means that conventional (typically water blown) flexible polyurethane foams cannot be melted after service life and recycled like a thermoplastic material. Typically, this type of conventional flexible polyurethane foams are usually shredded and bonded together to make low quality foam products after their service life.

U.S. Pat. No. 3,769,245 discloses the production of a thermoplastic polyurethane (TPU) foam using dicarboxylic acids as (chemical) blowing agent. High density foams are obtained (400 kg/m³) having an amide hard-block structure.

CN10592461 describes thermoplastic polyurethane (TPU) which can be used to produce closed-cell extruded TPU foams (also referred to as expanded TPU or eTPU) with high density and heat resistance. The process starts from TPU pellets and a cellular structure is attained using a foam extrusion process which involves melt-processing of the TPU pellets. The density of the expanded TPU foam in CN10592461 is in the range between 400 and 600 kg/m³. Furthermore, the technology for producing these eTPUs gives closed-cell foams thereby limiting their application in several fields. Expanding TPU to form eTPU is also a cumbersome process with several intermediate processes requiring excess energy.

Furthermore, current state of the art conventional low density (e.g. having densities below 100 kg/m³) flexible polyurethane foams with a predominant open-cell structure have a rather low tear strength, typically in the range 150-250 N/m.

To solve above problems, there is a need to produce low density (being below 200 kg/m³) flexible polyurethane foams having a predominantly open-cell structure and improved mechanical properties such as tear strength which can be melted and recycled after their service life thereby significantly increasing their rework, recycling possibilities and application field.

Aim of the Invention

The ultimate goal would be to achieve a low density polyurethane flexible foam which is
- polymerized and blown in-situ, and
- having a predominantly open-cell structure (at least 50% open-cell content), and
- having an apparent density below 200 kg/m³ measured according to ISO 845, and
- thermally recyclable (e.g. via extrusion) to a material having a TPU matrix similar or identical to TPU materials made using state of the art TPU manufacturing processes, and
- melt reprocessable after its service-life It is a further object of the present invention to develop a reactive mixture and a method for making flexible polyurethane foams having a predominantly open-cell structure and significant improved mechanical properties such as tear strength which are easily melt-reprocessable and recyclable after service life (use).

Definitions and Terms

In the context of the present invention the following terms have the following meaning:
1) "NCO value" or "isocyanate value" as referred to herein is the weight percentage of reactive isocyanate (NCO) groups in an isocyanate, modified isocyanate or isocyanate prepolymer compound.
2) The "isocyanate index" or "NCO index" or "index" as referred to herein is the ratio of NCO-equivalents to the sum of equivalents of isocyanate-reactive hydrogen atoms present in a formulation, given as a percentage:

$$\frac{[NCO] \times 100}{[active\ hydrogen]}(\%)$$

In other words, the NCO-index expresses the percentage of isocyanate actually used in a formulation with respect to the amount of isocyanate theoretically required for reacting with the amount of isocyanate-reactive hydrogen used in a formulation.
3) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

4) The term "average nominal functionality" (or in short "functionality") is used herein to indicate the number average of functional groups per molecule in a composition.

5) The term "average nominal hydroxyl functionality" (or in short "hydroxyl functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

6) The term "hardblock" refers to 100 times the ratio of the amount (in pbw) of polyisocyanate+isocyanate-reactive materials having a molecular weight less than 500 g/mol (wherein polyols having a molecular weight of more than 500 g/mol incorporated in the polyisocyanates are not taken into account) over the amount (in pbw) of all polyisocyanate+all isocyanate-reactive materials used. The hardblock content is expressed in %.

7) The word "average" refers to number average unless indicated otherwise.

8) "Liquid" means having a viscosity of less than 10 Pa·s measured according to ASTM D445-11a at 20° C.

9) As used herein, the term "thermoplastic" is used in its broad sense to designate a material characterised by a partially crystalline and chemically uncross-linked polymer. In its solid state, the storage (or elastic) modulus (G') of a thermoplastic material is higher than the loss (or viscous) modulus (G"). In this region, they may show a rubber-elastic plateau, i.e. G' and G" maintain a stable value over temperature. At higher temperatures, the thermally reversible interactions between the macromolecules become temporary not effective and the individual molecules can gradually move freely. Thermoplastic material becomes therefore gradually more viscous; this is reflected in a sharp decrease of G' and G" over temperature and an increase of the ratio of G" to G' until the melting of the material occurs, region where G" becomes higher than G'. This polymer's behaviour makes the thermoplastic materials reprocessable at elevated temperatures. Conversely, the term "thermoset" is used herein to designate a material, characterised by a cross-linked polymer. In its solid state, a thermoset material shows a similar rheological behaviour of a thermoplastic one, G' stays higher than G" with likely a rubber-elastic plateau. Differently to what occurs in thermoplastic materials, when heated the individual molecules of a thermoset material are firmly embedded in a three-dimensional network formed by strong chemical bonds and therefore cannot freely move. Hence, the material can soften to a certain extent, but it does not melt, i.e. G' and G" slightly decrease over temperature without drastically change their slopes. Chemical bonds of thermoset materials remain stable as long as the temperature is too high and the material starts to degrade. Hence, thermoset materials typically degrade before melting giving them almost no reprocessability at melting temperature.

10) As used herein, the term "flexible foam" is used in its broad sense to designate a low density cellular material (apparent density<200 kg/m³) with a resistance to compression that is both limited and reversible.

11) The term "elastomeric material" or "elastomer" as determined according to ASTM D1566 designates a material which, at room temperature, is capable of recovering substantially in shape and size after removal of a deforming force.

12) The term "difunctional" as used herein means that the average nominal functionality is about 2. A difunctional polyol (also referred to as a diol) refers to a polyol having an average nominal hydroxyl functionality of about 2 (including values in the range 1.9 up to 2.1). A difunctional isocyanate refers to an isocyanate composition having an average nominal isocyanate functionality of about 2 (including values in the range 1.9 up to 2.1).

13) The term "polyurethane", as used herein, is not limited to those polymers which include only urethane or polyurethane linkages. It is well understood by those of ordinary skill in the art of preparing polyurethanes that the polyurethane polymers may also include allophanate, carbodiimide, uretidinedione, and other linkages in addition to urethane linkages.

14) The expression "Reaction system", "Reactive foam formulation" and

"Reactive mixture" as used herein refers to a combination of reactive compounds used to make a thermoplastic polyurethane comprising foam wherein the polyisocyanate compounds are usually kept in one or more containers separate from the isocyanate-reactive compounds.

15) The term "room temperature" refers to temperatures of about 20° C., this means referring to temperatures in the range 18° C. to 25° C. Such temperatures will include, 18° C., 19° C., 20° C., 21° C., 22° C., 23° C., 24° C. and 25° C.

16) Unless otherwise expressed, the "weight percentage" (indicated as % wt or wt %) of a component in a composition refers to the weight of the component over the total weight of the composition in which it is present and is expressed as percentage.

17) Unless otherwise expressed, "parts by weight" (pbw) of a component in a composition refers to the weight of the component over the total weight of the composition in which it is present and is expressed as pbw.

18) The "density" of a foam is referring to the apparent density as measured on foam samples by cutting a parallelepiped of foam, weighing it and measuring its dimensions. The apparent density is the weight to volume ratio as measured according to ISO 845 and is expressed in kg/m³.

19) Unless otherwise specified, "CLD hardness" and "CLD 40" refer to Compression Load Deflection at 40% compression measured according to ISO 3386/1.

20) "Resilience" (also referred to as ball rebound) is measured according to ISO 8307 and is expressed in % with the provisio that the resilience is measured on non-crushed samples.

21) "Tear strength" and "Trouser tear strength" as referred to herein is measured according to DIN 53356 and is expressed in N/m. Tear strength in general and more in particular trouser tear strength measure the ability of a foam to resist tearing or shredding. This is important in applications where foams must be handled frequently, such as in upholstering.

22) The term "difunctional polyol" refers to a polyol having an average hydroxyl functionality of about 2, preferably in the range 1.9-2.1. A difunctional polyol (diol) composition according to the present invention is not permitted to have an average hydroxyl functionality of more than 2.2 and not permitted to have an average hydroxyl functionality of less than 1.8.

23) The term "Open-cell foams" refers to foams having cells not totally enclosed by wall membranes and open to the surface of the foam either directly or by inter-connecting with other cells such that liquid and air can easily travel through the foam. As used herein, the term open-cell foam refers to a foam having an open-cell content of at least 50% by volume such as 60 to 99% or 75 to 99% by volume, calculated on the total volume of the foam and measured according to ASTM D6226-10 (Open-cell Content by Pycnometer).

24) A "physical blowing agent" herein refers to permanent gasses such as $CO_2$, $N_2$ and air as well as volatile compounds (low boiling inert liquids) that expand the polyurethane polymer by vaporization during the poly-urethane formation. Examples of suitable volatile com-pounds include but are not limited to chloro fluoro carbons (CFCs), hydro fluoro carbons (HFCs), hydro chloro fluoro carbons (HCFCs), hydro fluoro olefins (HFO's), Hydro Chloro Fluoro Olefins (HCFO's), and hydrocarbons such as pentane, isopentane and cyclo-pentane. The bubble/foam-making process is irrevers-ible and endothermic, i.e. it needs heat (e.g. from the chemical reaction exotherm) to volatilize a (low boil-ing) liquid blowing agent.

25) A "chemical blowing agent" includes compounds that decompose under processing conditions and expand the polyurethane polymer by the gas produced as a side product.

26) A "non-reactive chemical blowing agent" is to be interpreted herein as a chemical blowing agent having no isocyanate reactive groups. Suitable examples of non-reactive chemical blowing agents include but are not limited to 1,1'-azobisformamide, sodium bicarbon-ate, p-toluene sulfonyl hydrazide, 4,4'-oxybis(benzene-sulfonyl)hydrazine and p-toluenesulfonylsemicarbaz-ide.

27) A "reactive chemical blowing agent" is to be inter-preted herein as a chemical blowing agent having isocyanate reactive groups. An example of a reactive chemical blowing agent is water which will decompose under processing conditions and expand the polyure-thane polymer by the $CO_2$ produced as a side product from the reaction of isocyanate and water.

28) "In-situ polymerisation" and "in-situ foaming" as used herein refers to a process wherein at least two liquid compositions (typically an isocyanate composi-tion with an isocyanate reactive composition) are mixed to form a reactive mixture and allowed to foam. In-situ polymerisation can be performed using injection moulding (comprising compression moulding), slabstock (free foaming in an open mould), spray foaming, . . .

29) "Injection moulding" and "reactive injection mould-ing" (RIM) refers to a process (typically involving high-pressure impingement) wherein two liquid com-positions are mixed to form a reactive mixture and immediately injected into a preformed mould. The components chemically react to form a polyurethane foam which takes the shape of the mould.

DETAILED DESCRIPTION

The present invention discloses low density (<200 kg/m³) flexible polyurethane foams with a predominantly open-cell structure (open-cell content of at least 50% by volume)

which are easily melt-reprocessable and recyclable after use. These flexible polyurethane foams are thermoplastic poly-urethane (TPU) foams which are polymerised and blown in-situ and which can be recycled after service-life (use) towards TPU starting materials similar to TPU materials made using state of the art TPU manufacturing processes by means of a thermal treatment above the melt temperature of the thermoplastic polyurethane material.

The present invention discloses a method and reactive mixture for making a thermoplastic flexible polyurethane foams with a predominantly open-cell structure. The reac-tive mixture of the invention used to make said foam is blown using non-reactive blowing agents, preferably physi-cal blowing agents. In case the physical blowing agents are volatile compounds (low boiling inert liquids), the blowing agents are evaporated or activated using the heat of the foaming reaction.

The use of the reactive mixture according to the invention will lead to a micro-phase separated polymer morphology, more in particular the formation of a distinctive crystalline hard block phase and a soft block phase. This micro-phase separation may contribute to the cell-opening of the foam, may give the foam superior properties compared to state-of-the-art flexible foams and may limit deterioration of the polyurethane matrix during recycling and/or remelting pro-cesses.

Therefore, the present invention discloses a reactive mix-ture for making a low density thermoplastic polyurethane (TPU) flexible foam having an apparent density below 200 kg/m³ and a predominantly open-cell structure (open-cell content of ≥50% by volume calculated on the total volume of the foam and measured according to ASTM D6226-10), said reactive mixture comprising mixing at an isocyanate index between 90 and 110 in situ at least following ingre-dients to form a reactive mixture:

a) a polyisocyanate composition comprising at least 75% by weight difunctional isocyanate compounds calcu-lated on the total weight of all isocyanate compounds in the polyisocyanate composition, and b) an isocyanate reactive composition comprising at least 75% by weight difunctional isocyanate reactive com-pounds calculated on the total weight of all isocyanate reactive compounds in the isocyanate reactive compo-sition and wherein said difunctional isocyanate reactive compounds are selected from at least one linear high molecular weight difunctional polyol having a molecu-lar weight in the range 500-20000 g/mol and at least one low molecular weight difunctional chain extender having a molecular weight<500 g/mol, and c) at least one polyurethane forming catalysts, and d) a blowing agent composition wherein at least 90 wt % of the blowing agents are selected from physical blow-ing agents and/or non-reactive chemical blowing agents having no isocyanate reactive groups, and e) optionally further additives such as surfactants, flame retardants, fillers, pigments and/or stabilizers and wherein the reactive mixture contains less than 0.1 wt % water calculated on the total weight of the reactive mixture.

According to embodiments, the ingredients b) up to e) are first combined (to form the so-called "b-side") and then reacted with the polyisocyanate composition.

According to embodiments, the low density thermoplastic polyurethane (TPU) flexible foam according to the invention is an injection moulded foam.

According to embodiments, the low density thermoplastic polyurethane (TPU) flexible foam according to the invention is a free risen foam or slabstock foam (performed in e.g. an open mould or conveyor belt).

According to embodiments, the low density thermoplastic polyurethane (TPU) flexible foam according to the invention is a sprayed foam using state of the art spray technology for polyurethane foaming.

According to embodiments, the process for making the low density TPU flexible foam according to the invention comprises at least the steps of:

i. pre-mixing the isocyanate reactive composition, the at least one polyurethane forming catalysts, the blowing agent composition, and optionally further additives, and then ii. mixing the polyisocyanate composition with the composition obtained in step i) to form a reactive mixture, and iii. allowing the reactive mixture obtained in step ii) to foam, and then iv. optionally curing and/or annealing the thermoplastic elastomer polyurethane foam obtained in step iii) at an elevated temperature According to embodiments, the step of mixing of the polyisocyanate composition with the pre-mixed (isocyanate reactive) composition obtained in step i) to form a reactive mixture is performed using a 2-component high pressure mixing system.

According to embodiments, the step of mixing of the polyisocyanate composition with the pre-mixed (isocyanate reactive) composition obtained in step i) to form a reactive mixture is performed using a 2-component dynamic mixing system.

According to embodiments, no external heat is preferably added to the reactive mixture, the reaction exotherm is sufficient to obtain a foamed structure.

According to embodiments, the step of allowing the reactive mixture obtained in step ii) to foam is performed in a mould and the mould temperature may be altered to affect skin properties. Elevated mould temperature may also prevent excessive heat loss, hereby helping conversion/molecular weight build-up during polymerisation.

According to embodiments, the method for making low density TPU flexible foam according to the invention is performed at an isocyanate index between 90 and 110, preferably from 90 up to 105, more preferably from 98 up to 102.

According to embodiments, the ingredients used to form the reactive mixture according to the invention are combined at an isocyanate index between 90 and 110, preferably at an isocyanate index from 90 up to 105, more preferably at an isocyanate index from 98 up to 102.

According to embodiments, the low density TPU flexible foam according to the invention has an open-cell content of ≥50% by volume, preferably ≥60% by volume, more preferably ≥75% by volume calculated on the total volume of the foam and measured according to ASTM D6226-10).

According to embodiments, the blowing agent composition comprises at least 90 wt %, preferably >95 wt %, more preferably >98 wt % of physical blowing agents and/or non-reactive chemical blowing agents having no isocyanate reactive groups based on the total weight of the blowing agent composition.

According to embodiments, the blowing agent composition comprises at least 90 wt %, preferably >95 wt %, more preferably >98 wt % of physical blowing agents based on the total weight of the blowing agent composition.

According to embodiments, the blowing agent composition comprises at least 90 wt %, preferably >95 wt %, more preferably >98 wt % of physical blowing agents based on the total weight of the blowing agent composition thereby avoiding the use of reactive chemical blowing agents.

According to embodiments, the blowing agent composition comprises less than 5 wt %, preferably less than 1 wt % of reactive chemical blowing agents calculated on the total weight of the blowing agent composition. In case the reactive composition comprises water, the water content should be less than 0.1 wt %, preferably less than 0.075 wt %, more preferably less than 0.050 wt % and most preferably less than 0.025 wt % calculated on the total weight of the reactive mixture.

In preferred embodiments no reactive chemical blowing agents having isocyanate reactive groups are added to the reactive mixture used to make the low density TPU flexible foam according to the invention.

According to embodiments, suitable physical blowing agents may be selected from $CO_2$, $N_2$, isobutene, methylformate, dimethyl ether, methylene chloride, acetone, t-butanol, argon, krypton, xenon, chloro fluoro carbons (CFCs), hydro fluoro carbons (HFCs), hydro chloro fluoro carbons (HCFCs), hydro fluoro olefins (HFO's), Hydro Chloro Fluoro Olefins (HCFO's), and hydrocarbons such as pentane, isopentane and cyclopentane and mixtures thereof.

According to preferred embodiments, the physical blowing agents are selected from at least $CO_2$ and/or $N_2$.

According to embodiments, the blowing agent composition comprises at least 90 wt %, preferably >95 wt %, more preferably >98 wt % physical blowing agents selected from $CO_2$ and/or $N_2$.

According to embodiments, the blowing agent composition comprises only physical blowing agents selected from $CO_2$ and/or $N_2$.

According to preferred embodiments, the blowing agent composition comprises at least 90 wt %, preferably >95 wt %, more preferably >98 wt % physical blowing agents selected from $CO_2$ and/or $N_2$ and the reactive composition comprises less than 0.1 wt % water, preferably less than 0.075 wt % water, more preferably less than 0.050 wt % water and most preferably less than 0.025 wt % water calculated on the total weight of the reactive mixture.

According to preferred embodiments, the blowing agent composition comprises only physical blowing agents selected from $CO_2$ and/or $N_2$ and the reactive composition comprises less than 0.1 wt % water, preferably less than 0.075 wt % water, more preferably less than 0.050 wt % water and most preferably less than 0.025 wt % water calculated on the total weight of the reactive mixture According to preferred embodiments, the physical blowing agents are selected from at least HFO blowing agents and/or HCFO blowing agents and/or hydrocarbons such as cyclo-pentane.

According to preferred embodiments, the physical blowing agents comprise at least HFO blowing agents and/or HCFO blowing agents and/or hydrocarbon such as cyclo-pentane.

According to embodiments, the blowing agents comprise at least 3,3,3-trifluoropropene, 1,2,3,3,3-pentafluoropropene, cis- and/or trans-1,3,3,3-tetrafluoropropene and/or 2,3,3-tetrafluoropropene, and/or 1,1,1,4,4,4-hexafluorobut-2-ene, and/or 1-chloro-3,3,3-trifluoropropene, and/or 2-chloro-3,3,3-trifluoropropene and mixtures thereof.

Preferred examples of commercially available suitable HFO blowing gases are Honeywell HFO-1234ze (Honeywell's trade name for trans-1,3,3,3-tetrafluoropropene) or Opteon® 1100 (Chemours' trade name for cis-1,1,1,4,4,4-hexafluorobut-2-ene, $CF_3CH=CHCF_3$).

A preferred example of a commercially available suitable HCFO blowing gas is Honeywell Solstice® 1233zd (Honeywell's trade name for trans-1-chloro-3,3,3-trifluoropropene, $CHCl=CHCF_3$) or Forane® 1233zd (Arkema's trade name for trans-1-chloro-3,3,3-trifluoropropene, $CHCl=CHCF_3$).

Suitable examples of non-reactive chemical blowing agents include but are not limited to 1,1'-azobisformamide, sodium bicarbonate, p-toluene sulfonyl hydrazide, 4,4'-oxybis(benzenesulfonyl)hydrazine and p-toluenesulfonylsemicarbazide.

In preferred embodiments water is not added to the reactive mixture used to make the low density TPU flexible foam according to the invention.

According to embodiments, the reactive mixture used to make the low density TPU flexible foam according to the invention comprises less than 0.1 wt % water, preferably less than 0.075 wt % water, more preferably less than 0.050 wt % water and most preferably less than 0.025 wt % water calculated on the total weight of the reactive mixture.

According to embodiments, the amount of water added to the reactive mixture used to make the low density TPU flexible foam according to the invention is in the range 0 up to 0.1 wt % water, preferably in the range 0 up to 0.075 wt % water, more preferably in the range 0 up to 0.050 wt % water, most preferably in the range 0 up to 0.025 wt % water calculated on the total weight of the reactive mixture.

According to embodiments, the amount of blowing agents used in the reactive mixture can vary based on, for example, the intended use and application of the foam product and the desired foam stiffness and density.

According to embodiments, the amount of blowing agents used in the reactive mixture is in the range 5 to 60 parts by weight, more preferably from 10 to 30 pbw per hundred weight parts isocyanate reactive compounds (polyol) in order to produce a low density flexible foam having a density<100 $kg/m^3$, e.g. a low density foam having densities in the range 10-100 $kg/m^3$.

According to embodiments, the polyisocyanate composition used to make the low density TPU flexible foam according to the invention comprises at least 75% by weight, at least 85% by weight, at least 95% by weight difunctional isocyanate compounds calculated on the total weight of all isocyanate compounds in the polyisocyanate composition.

According to embodiments, the difunctional isocyanates (diisocyanates) may be selected from aliphatic diisocyanates selected from hexamethylene diisocyanate, isophorone diisocyanate, methylene dicyclohexyl diisocyanate and cyclohexane diisocyanate and or from aromatic diisocyanates selected from toluene diisocyanate (TDI), naphthalene diisocyanate, tetramethylxylene diisocyanate, phenylene diisocyanate, toluidine diisocyanate and, in particular, diphenylmethane diisocyanate (MDI).

Preferred polyisocyanate compositions are those containing at least 50 wt %, more preferably at least 70 wt %, most preferably at least 85 wt % of 4,4'-diphenylmethane diisocyanate or its hydrogenated derivative.

According to embodiments, the polyisocyanate composition used in the process of the present invention contains essentially (at least 95% by weight, more preferably at least 98% by weight calculated on the total weight of the polyisocyanate composition) pure 4,4'-diphenylmethane diisocyanate.

According to embodiments, the polyisocyanate composition used in the process of the present invention contains mixtures of 4,4'-diphenylmethane diisocyanate with one or more other organic diisocyanates, especially other diphenylmethane diisocyanates, for example the 2,4'-isomer optionally in conjunction with the 2,2'-isomer.

According to embodiments, the polyisocyanate compounds in the polyisocyanate composition may also be an MDI variant derived from a polyisocyanate composition containing at least 95 wt % 4,4'-diphenylmethane diisocyanate. MDI variants are well known in the art and, for use in accordance with the invention, particularly include liquid products obtained by introducing carbodiimide groups into said polyisocyanate composition and/or by reacting with one or more polyols.

According to embodiments, the polyisocyanate compounds in the polyisocyanate composition may also be isocyanate-terminated prepolymer which is prepared by reaction of an excessive amount of the polyisocyanate with a suitable difunctional polyol in order to obtain a prepolymer having the indicated NCO value. Methods to prepare prepolymers have been described in the art. The relative amounts of polyisocyanate and polyol depend on their equivalent weights and on the desired NCO value and can be determined easily by those skilled in the art. The NCO value of the isocyanate-terminated prepolymer is preferably above 5 wt %, more preferably above 10%, most preferably above 15 wt %.

According to embodiments, the isocyanate reactive composition used to make the low density TPU flexible foam according to the invention is having an average hydroxyl functionality in the range 1.9 up to 2.1.

According to embodiments, the isocyanate reactive composition comprises at least 75% by weight difunctional polyols, more preferably at least 85% by weight difunctional polyols, most preferably at least 90% by weight difunctional polyols calculated on the total weight of all isocyanate reactive compounds in the isocyanate reactive composition.

According to embodiments, the isocyanate reactive composition comprises at least 90% by weight difunctional polyols, more preferably at least 95% by weight difunctional polyols, most preferably at least 98% by weight difunctional polyols calculated on the total weight of all isocyanate reactive compounds in the isocyanate reactive composition.

According to embodiments, the difunctional polyols in the isocyanate reactive composition are selected from at least one linear high molecular weight difunctional polyol having a molecular weight in the range 500-20000 g/mol and at least one low molecular weight difunctional chain extender having a molecular weight<500 g/mol and the amount of linear high molecular weight difunctional polyol is at least 80 wt %, more preferably at least 85 wt %, most preferably at least 90 wt % calculated on the total weight of the isocyanate reactive composition.

According to embodiments, the low density polyurethane foam has a hardblock content in the range 30% up to 65%, preferably in the range 40% up to 65%, more preferably in the range 40% up to 55% and the difunctional polyols in the isocyanate reactive composition are selected from at least one linear high molecular weight difunctional polyol having a molecular weight in the range 500-20000 g/mol and at least one low molecular weight difunctional chain extender having a molecular weight<500 g/mol and the amount of linear high molecular weight difunctional polyol is in the range 50-95 wt %, more preferably in the range 60-90 wt % calculated on the total weight of the isocyanate reactive composition.

According to embodiments, the high molecular weight difunctional polyol used in the isocyanate reactive composition has a molecular weight of between 500 g/mol and 20000 g/mol, preferably in the range 500 g/mol up to 10000 g/mol, more preferably in the range 500 g/mol up to 5000 g/mol, most preferably in the range 650 g/mol up to 4000 g/mol.

Suitable high molecular weight difunctional polyols have molecular weights of 650 g/mol, 1000 g/mol and 2000 g/mol.

According to embodiments, the high molecular weight difunctional polyol are selected from linear polyester polyols, polyether polyols, and/or polyether-polyester polyols (including specialty polyester diols such as polycaprolactone diols). Mixtures of said polyols may be used in such ratios that at least 75 wt % of the total polyol composition is difunctional.

According to embodiments, the high molecular weight difunctional polyol may comprise and/or may be selected from a silica based diol such as dihydroxyl-terminated polydimethylsiloxane (PDMS-diol), a dihydroxyl terminated polybutadiene (HTPB-diol), fatty acids dimer-based polyester diols and mixtures thereof.

According to embodiments, the low density TPU flexible foam according to the invention may be fabricated using mainly high molecular weight difunctional polyol(s) selected from polyester diols. These thermoplastic elastomer polyurethane foams will have excellent compatibility with PVC and other polar plastics.

According to embodiments, the low density TPU flexible foam according to the invention may be fabricated using mainly high molecular weight difunctional polyol(s) selected from polyether diols. These thermoplastic elastomer polyurethane foams will have excellent low temperature flexibility and hydrolysis resistance, making them suitable for applications where water is a consideration.

The high molecular weight difunctional polyol(s) which may be used in the isocyanate reactive composition include products obtained by the polymerization of a cyclic oxide, for example ethylene oxide, propylene oxide, butylene oxide or tetrahydrofuran in the presence, where necessary, of difunctional initiators. Suitable initiator compounds contain 2 active hydrogen atoms and include water, butanediol, ethylene glycol, propylene glycol, diethylene glycol, triethylene glycol, dipropylene glycol, 1,3-propane diol, neopentyl glycol, 1,4-butanediol, 1,5-pentanediol, 2-methyl-1,3-propanediol, 1,6-pentanediol and the like. Mixtures of initiators and/or cyclic oxides may be used.

Suitable polyester diols which may be used in the isocyanate composition include hydroxyl-terminated reaction products of dihydric alcohols such as ethylene glycol, propylene glycol, diethylene glycol, 1,4-butanediol, neopentyl glycol, 2-methyl-1,3-propanediol, 1,6-hexanediol or cyclohexane dimethanol or mixtures of such dihydric alcohols, and dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polycaprolactones and unsaturated polyesterpolyols should also be considered. Polyesteramides may be obtained by the inclusion of aminoalcohols such as ethanolamine in polyesterification mixtures.

Polyester diols, polyether diols and polycarbonate diols are preferred high molecular weight difunctional polyols in the present invention.

According to embodiments, the at least one low molecular weight difunctional isocyanate reactive compound (chain extender) in the isocyanate reactive composition have a molecular weight<500 g/mol, preferably a molecular weight in the range 45 up to 500 g/mol, more preferably in the range 50 up to 250 g/mol.

Suitable difunctional chain extenders in the isocyanate composition include diols, such as aliphatic diols like ethylene glycol, 1,3-propanediol, 2-methyl-1,3-propanediol, 1,4-butanediol, 1,5-pentanediol, 1,6-hexanediol, 1,8-octanediol, 1,9-nonanediol, 1,10-decanediol, 1,12-dodecanediol, 1,2-propanediol, 1,3-butanediol, 2,3-butanediol, 1,3-pentanediol, 2-ethyl-butanediol, 1,2-hexanediol, 1,2-octanediol, 1,2-decanediol, 3-methylpentane-1,5-diol, 2-methyl-2,4-pentanediol, 3-methyl-1,5-pentanediol, 2,5-dimethyl-2,5-hexanediol, 3-chloro-propanediol, 1,4-cyclohexanediol, 2-ethyl-2-butyl-1,3-propanediol, diethylene glycol, dipropylene glycol and tripropylene glycol and 1,4'-butylenediol and cyclohexane dimethanol.

Further suitable difunctional chain extenders include aminoalcohols such as ethanolamine, N-methyldiethanolamine and the like, diamines, hydrazines, triazines such as caprinoguanamine (6-Nonyl-1,3,5-triazine-2,4-diamine) and hydrazides and mixtures thereof.

According to embodiments, the difunctional chain extenders are selected from 1,6 hexanediol, 1,4-butanediol or ethylene glycol. 1,4-Butanediol is most preferred.

Diesters of terephthalic acid with glycols having 2 to 4 carbon atoms, e.g. terephthalic acid bis(ethylene glycol) or bis-1,4-butanediol, and hydroxyalkylene ethers of hydroquinone, and polyoxytetramethylene glycols having molecular weights<500 g/mol are also suitable difunctional chain extenders.

According to embodiments, the difunctional chain extenders are selected from 1,6-hexanediol, 1,4-butanediol and/or ethylene glycol, most preferably 1,4-butanediol in an amount of at least 2 wt % calculated on the total weight of the isocyanate reactive composition. More preferably the amount of chain extenders is in the range 2-20 parts by weight calculated on the total weight of the isocyanate reactive composition.

According to embodiments, the difunctional chain extenders are selected from at least 90 wt % of 1 type of chain extender compound which is beneficial for the phase separation. Preferably said chain extender compound is selected from 1,6-hexanediol, 1,4-butanediol or ethylene glycol, most preferably 1,4-butanediol in an amount of at least 2 wt % calculated on the total weight of the isocyanate reactive composition. More preferably the amount of chain extenders is in the range 2-10 wt % calculated on the total weight of the isocyanate reactive composition.

According to embodiments, the difunctional chain extenders may be selected from 0.5-2 wt % caprinoguanamine (6-Nonyl-1,3,5-triazine-2,4-diamine) and 6-8 wt % of 1,6-hexanediol, 1,4-butanediol and/or ethylene glycol. Especially for low density flexible foams in the range 15 up to 60 kg/m³, the presence of small amounts of caprinoguanamine (0.5-2 wt % calculated on the total weight of the isocyanate reactive composition) in addition to low molecular weight diol chain extenders (such as 1,4-butanediol) may be beneficial for the stability of the obtained foam.

According to embodiments, the isocyanate reactive composition might further comprise solid polymer particles such as styrene-based polymer particles. Examples of styrene polymer particles include so-called "SAN" particles of styrene-acrylonitrile. Alternatively, small amounts of polymer polyols may be added as an additional polyol in the isocyanate reactive composition. An example of a commercial available polymer polyol is HYPERLITE® Polyol 1639 which is a Polyether polyol modified with a styrene-acrylonitrile polymer (SAN) with a solid content of approximately 41 wt % (also referred to as polymer polyol).

According to embodiments, the reactive mixture and/or isocyanate reactive composition may comprise fillers such as wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

According to embodiments, other conventional ingredients (additives and/or auxiliaries) may be used in making the thermoplastic elastomeric foam according to the invention. These include surfactants, flame proofing agents, fillers, pigments, stabilizers and the like.

According to embodiments, the surfactant used is selected from a silicon surfactant. Examples of suitable commercially available surfactants are Tegostab® B8494, Tegostab® B8466 and Tegostab® B8416.

According to embodiments, suitable catalysts accelerate in particular the reaction between the NCO groups of the diisocyanates a) and accelerate the hydroxyl groups of components b) and c) and are selected from those known in the prior art such as metal salt catalysts, such as organotins, and amine compounds, such as triethylenediamine (TEDA), N-methylimidazole, 1,2-dimethylimidazole, N-methylmorpholine, N-ethylmorpholine, triethylamine, N,N'-dimethylpiperazine, 1,3,5-tris(dimethylaminopropyl) hexahydrotriazine, 2,4,6-tris(dimethylaminomethyl)phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylaminocyclohexylamine, pentamethyldipropylene triamine, triethanolamine, dimethylethanolamine, bis(dimethylaminoethyl)ether, tris(3-dimethylamino)propylamine, or its acid blocked derivatives, and the like, as well as any mixture thereof. The catalyst compound should be present in the reactive composition in a catalytically effective amount, generally from about 0 to 5% by weight, preferably 0 to 1-% by weight, based on total weight of all reactive ingredients used.

All reactants can be reacted at once or can be reacted in a sequential manner. By prior mixing all or part of the isocyanate-reactive compounds solutions or suspensions or dispersions are obtained. The various components used in the manufacture of the compositions of the invention can in fact be added in any order. The process can be selected from a bulk process, either batch or continuous process including cast process.

According to embodiments, the low density TPU flexible foam according to the invention is a low apparent density TPU flexible foam with a predominantly open-cell structure, preferably the open-cell content is at least 50% by volume, more preferably at least 65% by volume, more preferably at least 75% by volume calculated on the total volume of the foam and measured according to ASTM D6226-10.

According to embodiments, the low density thermoplastic polyurethane (TPU) flexible foam has an apparent density in the range 100-200 kg/m³.

According to embodiments, the low density thermoplastic polyurethane (TPU) flexible foam has an apparent density below 100 kg/m³, preferably in the range 10-100 kg/m³, more preferably in the range 15-100 kg/m³, most preferably in the range 25-100 kg/m³.

According to embodiments, the low density TPU flexible foam according to the invention is a low apparent density foam with a predominantly open-cell structure, a hardblock content in the range 15 up to 65%, an apparent density in the range 100-200 kg/m³ measured according to ISO 845.

According to embodiments, the low density TPU flexible foam according to the invention is a low apparent density foam with an open-cell structure having a core apparent density below 100 kg/m³. Examples of these foam have core densities of around 70 kg/m³, around 80 kg/m³, around 45 kg/m³ and around 35 kg/m³.

According to embodiments, the low density TPU flexible foam according to the invention is a low density foam having a hardblock content in the range 15 up to 65%, preferably in the range 20% up to 60%, more preferably in the range 30% up to 65%, most preferably in the range 40% up to 65% and even most preferably in the range 40% up to 55%.

According to embodiments, the low density TPU flexible foam according to the invention is a low apparent density foam with an open-cell structure having an open-cell content of at least 60% by volume, such as at least 75% by volume, such as 60 to 99% or 75 to 99% by volume, measured according to ASTM D6226-10.

According to embodiments, the low density TPU flexible foam according to the invention is a low density foam having an apparent density below 100 kg/m³, preferably in the range 10-100 kg/m³, more preferably in the range 15-100 kg/m³, most preferably in the range 25-100 kg/m³ with a predominantly open-cell structure having a CLD 40 hardness in the range 0.05 up to 500 kPa, more preferably in the range 1 up to 100 kPa measured according to ISO 3386/1.

According to embodiments, low density TPU flexible foam according to the invention is a low density foam having a density below 100 kg/m³ preferably in the range 10-100 kg/m³, more preferably in the range 15-100 kg/m³, most preferably in the range 25-100 kg/m³ with a predominantly open-cell structure having a CLD 40 hardness≤100 kPa, preferably in the range 1 up to 50 kPa and most preferably in the range 2 up to 25 kPa at 40% compression measured according to ISO 3386/1. Suitable low apparent density TPU flexible foams according to the invention may have a CLD of 7 kPa, 10 kPa, 11 kPa, 15 kPa, 20 kPa and 25 kPa.

According to embodiments, low density TPU flexible foam according to the invention is a low density foam having a density in the range 100-200 kg/m³ with a predominantly open-cell structure, having a hardblock content in the range 15 up to 65% and having a CLD hardness in the range 2 up to 2000 kPa at 40% compression measured according to ISO 3386/1, e.g. a CLD 40 hardness of 300 kPa at 40% compression measured according to ISO 3386/1.

According to embodiments, low density TPU flexible foam according to the invention is a low density foam having a density in the range 100-200 kg/m³ having a predominantly open-cell structure, a hardblock content in the range 30% up to 65%, preferably in the range 40% up to 65% and having a CLD hardness in the range 10 up to 1000 kPa at 40% compression measured according to ISO 3386/1.

According to embodiments, low density TPU flexible foam according to the invention is a low density foam having a density in the range 100-200 kg/m³ having a predominantly open-cell structure, a hardblock content in the range 40% up to 55% and having a CLD hardness in the range 10 up to 500 kPa at 40% compression measured according to ISO 3386/1.

According to embodiments, low density TPU flexible foam according to the invention is a low density foam having a density in the range 100-200 kg/m³ having a predominantly open-cell structure, a hardblock content>50% and having a CLD hardness in the range 10 up to 2000 kPa, preferably 25 up to 1000 kPa, more preferably 50 up to 1000 kPa at 40% compression measured according to ISO 3386/1.

According to embodiments, the low density TPU flexible foam according to the invention is a low apparent density thermoplastic elastomer foam with a predominantly open-cell structure having a hardblock content in the range 15 up to 65%, preferably in the range 20% up to 60%, more preferably in the range 30% up to 65%, most preferably in the range 40% up to 55%, and an apparent density in the range 100-200 kg/m³ measured according to ISO 845, and an open-cell content of at least 50% by volume, preferably at least 65% by volume, more preferably at least 75% measured according to ASTM D6226-10, and a trousers tear strength>1000 N/m, preferably >1500 N/m measured according to DIN 53356

According to embodiments, the low density TPU flexible foam according to the invention is a low apparent density thermoplastic elastomer foam with a predominantly open-cell structure having:

a hardblock content in the range 15 up to 65%, preferably in the range 20% up to 60%, more preferably in the range 30% up to 65%, most preferably in the range 40% up to 55%, and an apparent density in the range 10-100 kg/m³, preferably in the range 15-100 kg/m³, more preferably in the range 25-100 kg/m³ measured according to ISO 845, and a trousers tear strength>100 N/m, preferably >250 N/m, more preferably >500 N/m measured according to DIN 53356, and an open-cell content of at least 50% by volume, preferably at least 65% by volume, more preferably at least 75% measured according to ASTM D6226-10

According to embodiments, low density TPU flexible foam according to the invention is a low density foam having a density in the range 35-100 kg/m³, more preferably in the range 50-100 kg/m³ with a predominantly open-cell structure having a trousers tear strength>1000 N/m, preferably >1500 N/m measured according to DIN 53356. An example of a low density TPU flexible foams according to the invention may have a density in the range 70 up to 100 kg/m³, a hardblock content in the range 30-65%, preferably in the range 40% up to 65% and a trousers tear strength>1500 N/m measured according to DIN 53356.

According to embodiments, the low density TPU flexible foam according to the invention is a low apparent density thermoplastic elastomer foam with a predominantly open-cell structure having a resilience (rebound) of more than 20%, preferably more than 40% measured according to ISO 8307.

According to embodiments, the low density TPU flexible foam according to the invention is a low apparent density thermoplastic elastomer foam with a predominantly open-cell structure having a resilience (rebound) of less than 40%, preferably less than 20% as measured according to ISO 8307.

According to embodiments, the low density TPU flexible foam according to the invention is a low apparent density thermoplastic elastomer foam with a predominantly open-cell structure having a resilience (rebound) of more than 20%, preferably more than 40%, more preferably in the range 40% up to 99% as measured according to ISO 8307.

According to embodiments, the low density TPU flexible foam according to the invention is a low apparent density thermoplastic elastomer foam with an open-cell structure having a resilience (rebound) in the range 25% up to 99% as measured according to ISO 8307. Suitable low apparent density TPU flexible foams according to the invention may have a resilience of 25%, 40%, 45%, 50%, 70%, 75%, 80%.

According to embodiments, the low density TPU flexible foam according to the invention is a low apparent density thermoplastic elastomer foam with an open-cell structure having a resilience (rebound) of <40%, preferably <20%, more preferably <10%, more preferably <5% measured according to ISO 8307.

According to embodiments, the low density TPU flexible foam according to the invention is a low apparent density flexible foam having a core apparent density in the range 25-80 kg/m³ which may be used as cushioning material in furniture and automotive seating and in mattresses, as carpet backing and as packaging foam. Due to the melt-reprocessability of the low apparent density TPU flexible foam according to the invention it is possible to create a density and/or hardness gradient in the foam. For example, the upper part (surface) of the foam might have a heat treatment such that a denser top layer is achieved. This might be beneficial e.g. to give the foam a comfortable design or shape.

Due to the open-cell structure of the low density TPU flexible foam according to the invention it is possible to use the foam for acoustic applications, e.g. sound absorption.

Due its good dynamic properties e.g. tuned damping and elasticity, the low density TPU flexible foam according to the invention might be used in automotive seating and thinner seats might be produced having similar and/or improved dynamic properties compared to state of the art thicker (thickness of the foam) automotive seats automotive seating. Using the low apparent density TPU flexible foam of the invention makes it possible to make thinner seats (cushioning) with improved or at least similar dynamic properties compared to state of the art thicker automotive seats.

Due its good dynamic properties the low density TPU flexible foam according to the invention might be used in footwear as midsoles and shoe uppers. The possibility of giving the midsole a specific design/shape by means of a heat treatment might be beneficial (e.g. for orthopaedic reasons).

The low density TPU flexible foam according to the invention might be used for hot-wire cutting.

The invention further provides a process for recycling and/or remelting the thermoplastic elastomeric foam according to the invention into non-foamed thermoplastic materials without significantly deteriorating the thermoplastic polymer matrix compared to state of the art recycled and/or remelted thermoplastic polyurethane (TPU) materials.

According to embodiments, the remelting/recycling of the thermoplastic elastomeric foam according to the invention is performed by a heat and/or compression process at temperatures above the melting temperature of the thermoplastic material of the elastomeric foam.

According to embodiments, the remelting/recycling of the thermoplastic elastomeric foam according to the invention is performed in an extruder at temperatures above the melting temperature of the thermoplastic material. By further addition of a blowing agent in the extruder a foamed recycled TPU foam might be achieved with closed cells.

The invention is illustrated with the following examples.

FIGURES

EXAMPLES

Figure 1:
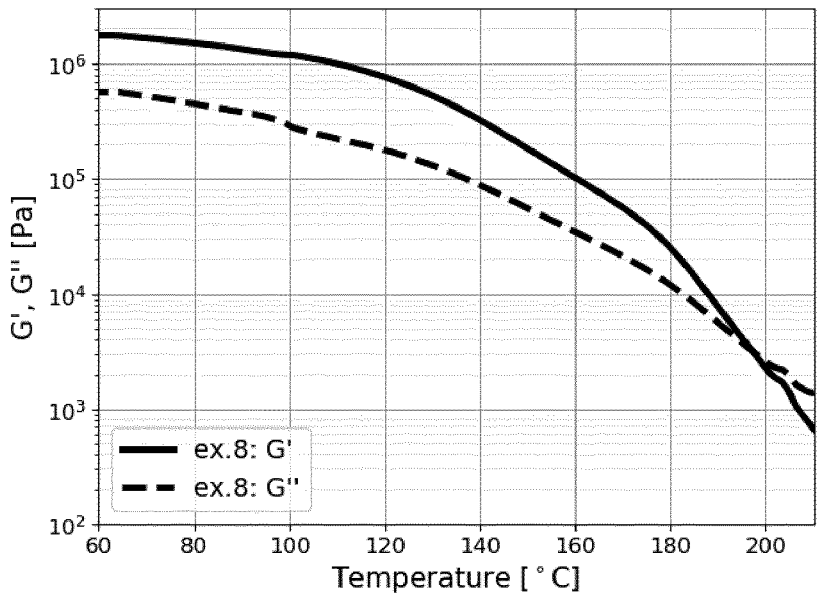
FIG. 1 illustrates the temperature dependent rheological properties (G' and G") corresponding to the polymer of a foam according to the invention made using a reactive mixture with no added water in the reactive mixture (example 8).

Chemicals Used:

Polyols

Caradol® ED56: Polypropylene glycol from with a hydroxyl value of 56.0 mg KOH/g.

Terathane® 650: polytetramethylene glycol with a hydroxyl value of 172.6 mgKOH/g. The polyol was dehydrated by vacuum distillation.

Terathane® 1000: Polytetramethylene glycol with a hydroxyl value of 112.2 mg KOH/g. The polyol was dehydrated by vacuum distillation.

Terathane® 2000: Polytetramethylene glycol with a hydroxyl value of 56.1 mg KOH/g. The polyol was dehydrated by vacuum distillation.

Daltorez® P708: hydroxyl terminated reaction product of 1,4-butanediol and adipic acid with a hydroxyl value of 50 mg KOH. The polyol was dehydrated by vacuum distillation.

Chain Extenders 1,4-butanediol: glycol chain extender. Dehydrated by vacuum distillation.

1,2-ethyleneglycol: glycol chain extender. Dehydrated by vacuum distillation.

Caprinoguanamine (2,4-diamino-6-nonyl-1,3,5-triazine). Obtained from Evonik.

Blowing Agent

Opteon® 1100: hydrofluoroolefin blowing agent with a boiling point of 33° C.

Distilled water

Isocyanate

Suprasec® 1306: a mixture of 98% by weight of 4,4'-diphenylmethane diisocyanate and 2% by weight of 2,4'-diphenylmethane diisocyanate.

Prepolymer: A prepolymer was prepared using 46.5 wt % Terathane® 2000 and 53.5 wt % Suprasec® 1306.

Catalyst

Tin(II)octoate: Tin(II) 2-ethylhexanoate, dissolved in dioctyladipate, applicable in examples 1-7.

Tin(II)octoate: Tin(II) 2-ethylhexanoate

Coscat® 83: Bismuth trineodecanoate

Dabco® S: 1,4-diazabicyclo[2.2.2]octane

Surfactants

Tegostab® B8494: Silicone surfactant

Tegostab® B8466: Silicone surfactant

Tegostab® B8716: Silicone surfactant

Test Methods

The compression stress at a strain of 40% (CLD 40) was measured according to the norm ISO 3386-1 on a foam slab with a surface of 10 by 10 cm and a thickness of 5 cm cut from the centre of the foam bun.

Trouser tear strength was measured according to DIN 53356 on a foam slab cut from the centre of the foam bun.

The resilience of the foams was determined according to ISO 8307 on a foam slab with a thickness of 5 cm cut from the centre of the foam bun in case of foams with an apparent density lower than 100 kg/m³. Resilience of foams with an apparent density higher than 200 kg/m3 was measured on foam slabs with a thickness of at least 15 mm.

The apparent density was determined by dividing the mass of a foam slab by its volume. The volume of the foam slab was determined by measuring the foam slab ribs with a calliper or ruler.

Rheology was measured using A TA ARES-G2 rotational rheometer together with electrically heated plate temperature system including an environmental cover and heated purge gas to perform rheology tests. According to ASTM D4440-08 (2008), small-amplitude oscillatory shear mode is used and samples are subjected to a homogeneous sinusoidal strain. The strain amplitude is forced to be constant at 1% during all temperature sweep and is sufficiently small such that the response is in the materials' linear regime. The frequency is fixed to 1 Hz over the entire experiment. Parallel plate geometry configuration of diameter equal to 25 mm is used. A solid preform disk of thickness about 1.65 mm of thermoplastic or thermoset polyurethanes polymer is placed between the two plates. Solid preform disks were prepared compressing a foam block in between two preheated metal plates.

Example 1

According to the Invention 522.46 g of Caradol® ED56, 94.05 g of 1,4-butanediol, 1.91 g of Tegostab® B8466, 2.86 g of Tegostab® B8716 and 74.71 g of Opteon® 1100 were weighed in a plastic cup of one litre and mixed gently. To this blend 341.93 g of Suprasec® 1306 and 3.0 g of catalyst solution (10 wt %) were added. The polyurethane formulation has a hard-block content of 45.5% and an isocyanate index of a 103.6%. The reactive mixture was mixed vigorously for 20 seconds and poured into a wooden mould where it rose freely. The foam bun was subsequently post-cured for 65 hours in an oven set at 120° C.

Foam slabs cut from the center of the foam bun had an apparent density of 84 kg/m³, a CLD hardness at 40% compression measured according to ISO 3386/1 of 11.7 kPa and a resilience of 25%.

Example 2

According to the Invention 350.0 g of Terathane® 650, 42.66 g of 1,2-ethyleneglycol, 1.40 g of Tegostab® B8466, 2.10 g of Tegostab® B8716 and 56.38 g of Opteon® 1100 were weighed in a plastic cup of 5 litre and mixed gently. To this blend 319.53 g of Suprasec® 1306 and 0.25 g of catalyst solution (20 wt %) were added. The polyurethane formulation has a hard-block content of 50.9% and an isocyanate index of a 104.0%. The reactive mixture was mixed vigorously for 10 seconds and poured into a wooden mould where it rose freely. The foam bun was subsequently post-cured for 18 hours in an oven set at 120° C.

Foam slabs cut from the center of the foam bun had an apparent density of 72 kg/m³, a CLD hardness at 40% compression measured according to ISO 3386/1 of 10.9 kPa and a resilience of 25%.

Example 3

According to the Invention 23.77 g caprinoguanamine and 594.22 g of Terathane® 2000 were heated in a glass jar to 110° C., followed by cooling down to room temperature. 280.85 g of this blend was weighed in a 1 litre plastic cup, followed by 0.41 g of Tegostab® 8494, 54.70 g of 1,4-butanediol and 75.40 g of Opteon® 1100. This blend was mixed gently before addition of 204.26 g of Suprasec® 1306 and 0.08 g of pure Tin(II) octoate. The polyurethane formulation has a hard-block content of 50.0% and an isocyanate index of a 102.0%. The reactive mixture was mixed vigorously for about 5 seconds and poured into a wooden mould where it rose freely. The foam bun was subsequently post-cured for 18 hours in an oven set at 120° C.

Foam slabs cut from the center of the foam bun had an apparent density of 38 kg/m³, a CLD hardness at 40% compression measured according to ISO 3386/1 of 11.81 kPa and a resilience of 25%.

Example 4

According to the Invention

For synthesis of the prepolymer 983.29 g of Terathane® 2000 was slowly added to 748.47 g of Suprasec® 1306 at a temperature between 70 and 80° C. over the course of 2 hours. After overnight storage at 50° C. the titrated NCO-value was 12.02 wt %. For the polyol blend 9.54 g caprinoguanamine and 163.20 g Terathane® 1000 were weighed in a 250 ml glass bottle and heated in an oven set at 110° C. until a homogeneous aspect is obtained. The polyurethane foam was prepared by weighing in a plastic cup 54.26 g of the polyol blend, 0.765 g of Tegostab® B8494 solution and 12.7 g of Opteon® 1100. These chemicals were mixed gently before addition of 46.9 g of the prepolymer and 0.25 g of catalyst solution. The reactive mixture was then mixed vigorously for about 7 seconds and allowed to rise freely in the cup. The foam bun was subsequently post-cured for 16 hours in an oven set at 90° C.

The polyurethane formulation has a hard-block content of 23.6 wt % and an isocyanate index of a 105.0%.

A foam slab cut from the center of the foam bun had an apparent density of 78 kg/m³, a CLD hardness at 40% compression measured according to ISO 3386/1 of 7.96 kPa and a resilience of 72%.

Example 5

According to the Invention

In a 425 ml cardboard cup 55.0 g Daltorez® P708, 10.15 g 1,4-butanediol, 0.21 g Tegostab® B8466, 0.31 g Tegostab® B8716 and 7.82 g of Opteon® 1100 were weighed and mixed gently. Afterwards 36.10 g of the Suprasec® 1306 is added, followed by 0.15 g of catalyst solution. The reactive mixture was mixed vigorously for about 20 seconds and poured in a 1 L plastic cup where the foam rose freely. The foam bun was subsequently post-cured for 18 hours in an oven set at 120° C. The polyurethane formulation has a hard-block content of 46 wt % and an isocyanate index of a 103.6%.

A foam slab cut from the centre of the foam bun had an apparent density of 81 kg/m³, a CLD hardness at 40% compression measured according to ISO 3386/1 of 15.51 kPa and a resilience of 45%.

Example 6

According to the Invention

In a 425 ml cardboard cup 55.00 g Daltorez® P708, 10.15 g 1,4-butanediol, 0.21 g Tegostab® B8466, 0.31 g Tegostab® B8716 and 7.82 g of Opteon® 1100 were weighed and mixed gently. Afterwards 36.10 g of Suprasec® 1306 is added, followed by 0.15 g of catalyst solution. The reactive mixture was mixed vigorously for about 20 seconds and poured in a 1 L plastic cup where the foam rose freely. The foam bun was subsequently post-cured for 18 hours in an oven set at 120° C. The polyurethane formulation has a hard-block content of 46 wt % and an isocyanate index of a 103.5%.

A Foam slab cut from the centre of the foam bun had an apparent density of 80.6 kg/m³, a CLD hardness at 40% compression measured according to ISO 3386/1 of 15.5 kPa and a resilience of 45%.

Example 7

According to the Invention

In a 1000 ml plastic cup 275.62 g Terathane® 2000, 49.99 g 1,4-butanediol, 1.00 g Tegostab® B8466, 1.51 g Tegostab® B8716 and 38.20 g Opteon® 1100 were weighed and mixed gently. Afterwards 178.84 g Suprasec® 1306 is added, followed by 0.75 g of catalyst solution. The reactive mixture was mixed vigorously for about 20 seconds and poured in a 5 L plastic bucket where the foam rose freely. The foam bun was subsequently post-cured for 18 hours in an oven set at 120° C. The polyurethane formulation has a hard-block content of 45 wt % and an isocyanate index of a 102%.

A Foam slab cut from the centre of the foam bun had an apparent density of 72 kg/m³, a CLD hardness at 40% compression measured according to ISO 3386/1 of 23.85 kPa, a resilience of 33% and a trouser tear strength of 1887 N/m measured according to DIN 53356.

Example 8

According to the Invention

A polyol blend was prepared by mixing 509.86 g Terathane® 2000, 88.94 g 1,4-butanediol and 0.7501 g Tegostab® B8466. A catalyst solution was prepared by combining 0.5027 g Dabco® S, 4.9850 g Terathane® 2000, 0.4953 g Tin(II)octoate, 1.0021 g Coscat® 83 and 13.4928 g dioctyladipate. For preparation of the foam 47.95 g polyol blend, 2.054 g catalyst solution and 11.0 g Opteon® 1100 were mixed in a 400 ml cardboard cup. Afterwards 52.38 g prepolymer was added to the cup, followed by vigorous mixing for about 12 seconds. The reactive mixture contains no added water. The reactive mixture was poured in a 1 L plastic cup, where the foam rose freely. The polyurethane formulation of the foam has a hard-block content of 34.9 wt % and an isocyanate index of a 100.0%.

Example 9

Not According to the Invention

A polyol blend was prepared by mixing 521.76 g Terathane® 2000, 70.04 g 1,4-butanediol, 0.8184 g Tegostab® B8466 and 6.752 g distilled water. A catalyst solution was prepared by combining 0.5027 g Dabco® S, 4.9850 g Terathane® 2000, 0.4953 g Tin(II)octoate, 1.0021 g Coscat® 83 and 13.4928 g dioctyladipate. For preparation of the foam 44.41 g of the polyol blend, 1.997 g catalyst solution and 5.55 g Opteon® 1100 were mixed in a 400 ml cardboard cup. Afterwards 55.35 g prepolymer was added to the cup, followed by vigorous mixing for about 12 seconds. The reactive mixture contains 0.5 wt % water calculated on the total weight of the reactive mixture. The reactive mixture was poured in a 1 L plastic cup, where the foam rose freely. The polyurethane formulation of the foam has a hard-block content of 35.2 wt % and an isocyanate index of a 100.3%.

Example 10

Not According to the Invention

A polyol blend was prepared by mixing 535.96 g Terathane® 2000, 48.04 g 1,4-butanediol, 0.87 g Tegostab® B8466 and 14.44 g distilled water. A catalyst solution was prepared by combining 0.5027 g Dabco® S, 4.9850 g Terathane® 2000, 0.4953 g Tin(II)octoate, 1.0021 g Coscat® 83 and 13.4928 g dioctyladipate. For preparation of the foam 41.48 g of the polyol blend, 2.033 g catalyst solution and 5.54 g Opteon® 1100 were mixed in a 400 ml cardboard cup. Afterwards 58.60 g prepolymer was added to the cup, followed by vigorous mixing for about 12 seconds. The reactive mixture contains 1 wt % water calculated on the total weight of the reactive mixture. The reactive mixture was poured in a 1 L plastic cup, where the foam rose freely. The polyurethane formulation of the foam has a hard-block content of 35.5 wt % and an isocyanate index of a 100.2%.

Figure 2:
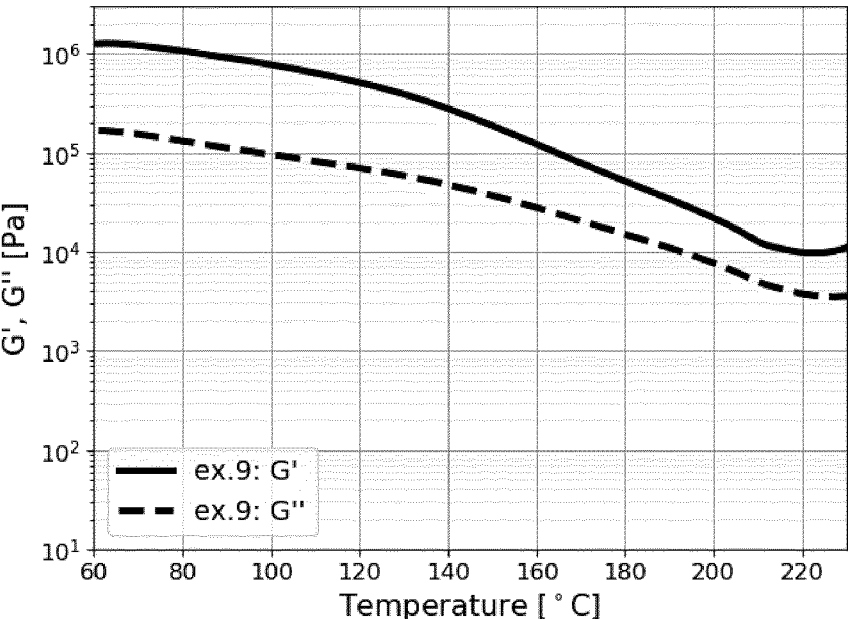
FIG. 2 illustrates the temperature dependent rheological properties (G' and G") corresponding to the polymer of a foam not according to the invention made using a reactive mixture with 0.5 wt % water calculated on the total weight of the reactive mixture (example 9).
Figure 3:
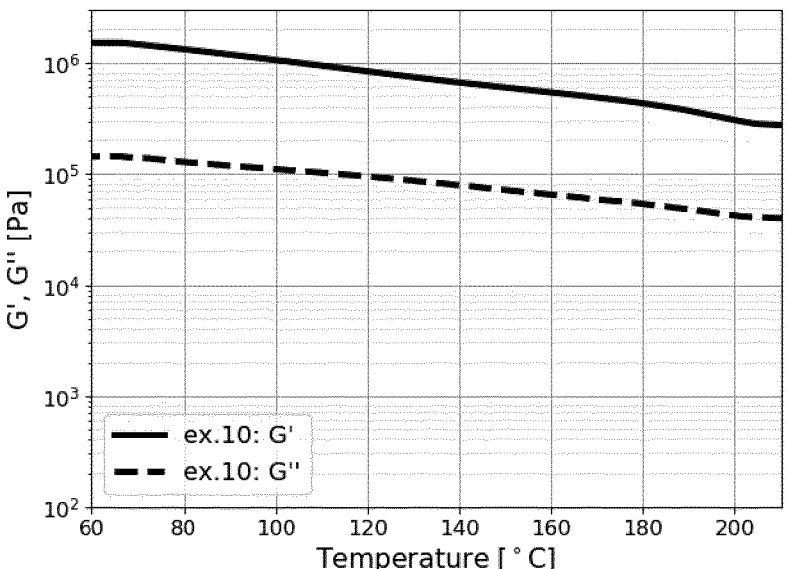
FIG. 3 illustrates the temperature dependent rheological properties (G' and G") corresponding to the polymer of a foam not according to the invention made using a reactive mixture with 1 wt % water calculated on the total weight of the reactive mixture (example 10).

FIGS. 1-3 show the temperature dependent rheological properties, G' and G" curves, from 60° C. to 230° C. for the example 8, example 9 and example 10, respectively. FIG. 2 and FIG. 3, corresponding to foams made using a reactive mixture with 0.5 wt % water (example 9) and 1 wt % water (example 10) calculated on the total weight of the reactive mixture, clearly show the typical behaviour of a chemically cross-linked polymer, i.e. thermoset material, with a stable plateau of G' and G" up to 120° C. followed by a gradual decrease of moduli' values at high temperatures. The two materials do not show any melting and the samples are still in their solid state. Indeed, G' is always three or more-times higher than G" for example 9 and seven or more-times higher than G" for example 10. Conversely, FIG. 1 corresponding to a foam made using a reactive mixture with no added water (example 8) shows the typical temperature dependent behaviour of uncross-linked partially crystalline polymer, i.e. thermoplastic material, with a rubber-elastic plateau between 60° C. and 120° C. followed by a very sharp decrease of both G' and G" and an increase of ration of G"

to G'. Moreover, around 210-220° C. the polymer is so much viscous that G" becomes higher than G', i.e. melting region.

The invention claimed is:

1. An in-situ method for making a thermoplastic polyurethane (TPU) flexible foam having (i) an open-cell content of ≥50% by volume calculated on the total volume of the foam and measured according to ASTM D6226-10, (ii) a density below 200 kg/m$^3$, measured according to ISO 845, (iii) a hardblock content in the range 15 up to 65%, and (iv) a trousers tear strength>100 N/m measured according to DIN 53356, said method comprising combining at an isocyanate index between 90 and 110 in situ at least following ingredients to form a reactive mixture:

a) a polyisocyanate composition comprising at least 90% by weight difunctional isocyanate compounds calculated on the total weight of all isocyanate compounds in the polyisocyanate composition, b) an isocyanate reactive composition comprising at least 90 wt % difunctional isocyanate reactive compounds calculated on the total weight of all isocyanate reactive compounds in the isocyanate reactive composition and wherein said difunctional isocyanate reactive compounds are selected from at least one linear high molecular weight difunctional polyol having a molecular weight in the range 500-20000 g/mol and at least one low molecular weight difunctional chain extender having a molecular weight<500 g/mol, c) at least one polyurethane forming catalysts, d) a blowing agent composition wherein at least 90 wt % of the blowing agents are selected from physical blowing agents and/or non-reactive chemical blowing agents having no isocyanate reactive groups, wherein the amount of blowing agents is from 5 to 60 parts by weight per hundred weight parts isocyanate reactive compounds, e) at least one compound acting as a surfactant, and f) optionally further additives and wherein the reactive mixture contains less than 0.1 wt % water calculated on the total weight of the reactive mixture and wherein said in-situ method is selected from a moulding process, a free-rise spray process or a free-rise slabstock process.

2. The method according to claim 1 wherein the isocyanate index is between 90 and 110.

3. The method according to claim 1 wherein the TPU flexible foam has an open-cell content of ≥60% by volume calculated on the total volume of the foam and measured according to ASTM D6226-10.

4. The method according to claim 1 wherein the physical blowing agents are selected from $CO_2$, $N_2$, or mixtures thereof.

5. The method according to claim 1 wherein the blowing agent composition comprises >95 wt % physical blowing agents selected from $CO_2$, $N_2$, or mixtures thereof.

6. The method according to claim 1 wherein the blowing agent composition comprises >95 wt % of physical blowing agents and/or non-reactive chemical blowing agents having no isocyanate reactive groups based on the total weight of the blowing agent composition and wherein the amount of blowing agents is from 5 to 60 parts by weight per hundred weight parts isocyanate reactive compounds.

7. The method according to claim 1 wherein the reactive mixture comprises less than 0.075 wt % of water calculated on the total weight of the reactive mixture calculated on the total weight of the blowing agent composition.

8. The method according to claim 1 wherein the physical blowing agents are selected from isobutene, methylformate, dimethyl ether, methylene chloride, acetone, t-butanol, argon, krypton, xenon, chloro fluoro carbons (CFCs), hydro fluoro carbons (HFCs), hydro chloro fluoro carbons (HCFCs), hydro fluoro olefins (HFO's), Hydro Chloro Fluoro Olefins (HCFO's), and hydrocarbons or mixtures thereof.

9. The method according to claim 1 wherein the polyisocyanate composition contains at least 95 wt % 4,4'-diphenylmethane diisocyanates calculated on the total weight of the polyisocyanate composition.

10. The method according to claim 1 wherein the polyisocyanate component in the polyisocyanate composition is an isocyanate-terminated prepolymer which is prepared by reaction of an excessive amount of the polyisocyanate having at least 85% of 4,4'-diphenylmethane diisocyanate with a difunctional polyol and wherein the NCO value of the isocyanate-terminated prepolymer is above 5 wt %.

11. The method according to claim 1 wherein the high molecular weight difunctional polyols are selected from polyester diols, polyether polyols and/or polyester polyether polyols having a molecular weight in the range 500 g/mol up to 10000 g/mol.

12. The method according to claim 1 wherein isocyanate reactive composition comprises at least 85 wt % difunctional polyols calculated on the total weight of the isocyanate reactive composition.

13. The method according to claim 1 wherein the difunctional chain extenders have a molecular weight<500 g/mol and are selected from 1,6 hexanediol, 1,4-butanediol and/or ethylene glycol in an amount of 2-10 wt % calculated on the total weight of the isocyanate reactive composition.

14. The method according to claim 1, said method comprising at least the steps of:

i. pre-mixing the ingredients b) up to e) and optionally f), and then ii. mixing the polyisocyanate composition with the composition obtained in step i) in situ to form a reactive mixture, and iii. allowing the reactive mixture obtained in step ii) to foam to obtain the TPU flexible foam.

15. The method according to claim 1 wherein the TPU flexible foam has a trousers tear strength >250N/m measured according to DIN 53356.

16. The method according to claim 1 wherein the TPU flexible foam has a trousers tear strength >500N/m measured according to DIN 53356.

* * * * *